US012555255B2

(12) United States Patent
Dana et al.

(10) Patent No.: US 12,555,255 B2
(45) Date of Patent: Feb. 17, 2026

(54) ABSOLUTE DEPTH ESTIMATION FROM A SINGLE IMAGE USING ONLINE DEPTH SCALE TRANSFER

(71) Applicant: SAMSUNG ELECTRONICS CO., LTD., Suwon-si (KR)

(72) Inventors: Alexandra Dana, Tel-Aviv (IL); Amit Shomer, Tel-Aviv (IL); Nadav Carmel, Tel-Aviv (IL); Tomer Peleg, Tel-Aviv (IL); Assaf Tzabari, Tel-Aviv (IL)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 386 days.

(21) Appl. No.: 18/180,643

(22) Filed: Mar. 8, 2023

(65) Prior Publication Data
US 2024/0303838 A1    Sep. 12, 2024

Related U.S. Application Data

(60) Provisional application No. 63/489,077, filed on Mar. 8, 2023.

(51) Int. Cl.
*G06T 7/50* (2017.01)
*G06T 3/40* (2024.01)
(Continued)

(52) U.S. Cl.
CPC ............ *G06T 7/50* (2017.01); *G06T 3/40* (2013.01); *G06T 7/80* (2017.01); *G06T 9/00* (2013.01);
(Continued)

(58) Field of Classification Search
CPC .... G06T 7/50; G06T 3/40; G06T 7/80; G06T 9/00; G06T 2207/20081; G06T 7/20; G06V 10/24; G06V 20/58
See application file for complete search history.

(56) References Cited

U.S. PATENT DOCUMENTS 10,019,657 B2    7/2018  Lin et al.
10,353,271 B2    7/2019  Wang et al.
(Continued)

FOREIGN PATENT DOCUMENTS

WO    2019-222467    11/2019
WO    2021-084530     5/2021
(Continued)

OTHER PUBLICATIONS

Cheng et al., "S^3 Net: Semantic-Aware Self-supervised Depth Estimation with Monocular Videos and Synthetic Data", arXiv:2007.14511 (Year: 2020).*

(Continued)

*Primary Examiner* — Vu Le
*Assistant Examiner* — Rachel Anne Ometz
(74) *Attorney, Agent, or Firm* — Morgan, Lewis & Bockius LLP

(57) ABSTRACT

The present disclosure provides architectures and techniques for absolute depth estimation from a single (e.g., monocular) image, using online depth scale transfer. For instance, estimation of up-to-scale depth maps from monocular images may be decoupled from estimation of the depth scale (e.g., such that additional online measurements, additional calibrations, etc. are not required). One or more aspects of the present disclosure include fine-tuning or training from scratch an absolute depth estimator using collected monocular images, as well as existing images and absolute depth measurements (e.g., from additional setups, such as LiDAR/stereo sensors). Collected monocular images may be used to create up-to-scale depth maps, and existing images and absolute depth measurements may be used to estimate the scale of a scene from the up-to-scale depth map. Scale transfer may thus be achieved between source images with (Continued)

known ground truth depth information and a new target domain of collected monocular images.

20 Claims, 9 Drawing Sheets

(51) Int. Cl.
  *G06T 7/80*     (2017.01)
  *G06T 9/00*     (2006.01)
  *G06V 10/24*    (2022.01)

(52) U.S. Cl.
  CPC .... *G06V 10/24* (2022.01); *G06T 2207/20081* (2013.01)

(56) References Cited

U.S. PATENT DOCUMENTS

| | | | |
|---|---|---|---|
| 10,762,650 | B1 | 9/2020 | Guo et al. |
| 10,984,543 | B1 | 4/2021 | Srinivasan |
| 11,138,751 | B2 | 10/2021 | Guizilini et al. |
| 11,361,456 | B2 | 6/2022 | Wang et al. |
| 11,443,445 | B2 | 9/2022 | Gan et al. |
| 11,494,927 | B2 * | 11/2022 | Guizilini .......... G06T 3/18 |
| 2019/0356905 | A1 * | 11/2019 | Godard .......... G06T 7/73 |
| 2021/0004646 | A1 * | 1/2021 | Guizilini .......... G06T 7/55 |
| 2022/0051425 | A1 | 2/2022 | Busam et al. |
| 2022/0156882 | A1 | 5/2022 | Chawla et al. |
| 2024/0135559 | A1 * | 4/2024 | Dikov .......... G06T 7/73 |
| 2024/0177329 | A1 * | 5/2024 | Cai .......... G06T 7/248 |

FOREIGN PATENT DOCUMENTS

| | | |
|---|---|---|
| WO | 2021-096324 | 5/2021 |
| WO | 2022-174198 | 8/2022 |
| WO | 2022-187753 | 9/2022 |

OTHER PUBLICATIONS

Zhou et al., "Unsupervised Learning of Depth and Ego-Motion from Video", arXiv:1704.07813v1 (Year: 2017).*
Lo et al., "Learning Feature Decomposition for Domain Adaptive Monocular Depth Estimation", arXiv:2208.00160 (Year: 2022).*
Swami et al., "Do What You Can, With What You Have: Scale-aware and High Quality Monocular Depth Estimation Without Real World Labels," 2022 IEEE/CVF Conference on Computer Vision and Pattern Recognition Workshops (CVPRW), New Orleans, LA, USA, 2022, pp. 987-996 (Year: 2022).*
Guizilini, et al., "3D Packing for Self-Supervised Monocular Depth Estimation", Computer Vision and Pattern Recognition, 10 pages; found on the internet: https://doi.org/10.48550/arXiv.1905.02693.
McCraith, et al., "Calibrating Self-supervised Monocular Depth Estimation", arXiv preprint arXiv:2009.07714v2 [cs.CV] Oct. 13, 2021, 13 pages.
Godard, et al., "Digging Into Self-Supervised Monocular Depth Estimation", Computer Vision and Pattern Recognition, 11 pages, found on the internet at: https://doi.org/10.48550/arXiv.1806.01260.
Sandler, et al., "MobileNetV2: Inverted Residuals and Linear Bottlenecks", arXiv preprint arXiv:1801.04381v4 [cs.CV] Mar. 21, 2019, 14 pages.

* cited by examiner

ABSOLUTE DEPTH ESTIMATION FROM A SINGLE IMAGE USING ONLINE DEPTH SCALE TRANSFER

CROSS REFERENCE TO RELATED APPLICATION

This application claims priority to, and the benefit of, U.S. Provisional Application Ser. No. 63/489,077 filed on Mar. 8, 2023, entitled ABSOLUTE DEPTH ESTIMATION FROM A SINGLE IMAGE USING ONLINE DEPTH SCALE TRANSFER. The entire contents of the foregoing application are hereby incorporated by reference for all purposes.

BACKGROUND

The following relates generally to image processing, and more specifically to estimating depth from monocular images using depth scale transfer.

The use of image capture devices, which may include still image cameras, moving image cameras or other electronic devices that include cameras or image sensors, has rapidly increased in recent years along with advancements in camera technology. Digital cameras may use image sensors (e.g., to capture images) and image signal processors (e.g., to process the captured images). Digital image processing refers to the use of a computer to edit a digital image using an algorithm or a processing network. Image processing software is commonly used for image editing, robot navigation, etc.

Object detection is an example of an image processing task that identifies and labels objects within an image. In some cases, object detection enables computers to interpret visual information similar to human beings. Object detection systems are a part of many vision-based applications, such as surveillance cameras, autonomous driving (e.g., for pedestrian avoidance applications), etc.

Some object detection tasks may include depth estimation techniques. Depth estimation may provide three-dimensional information about the object or scene, allowing for a more accurate interpretation of object size, shape, and location relative to other objects. Depth estimation information may be used in applications such as autonomous vehicles, augmented reality, and robotics, where objects may be accurately located and differentiated in three-dimensional space for safe and effective operation.

In some cases, conventional depth estimation techniques (e.g., such as single image depth estimation techniques) may demand continuous fine-tuning and continuous adjusting to new scenes, may demand new image collection, and may not efficiently determine a scale for depth predictions (e.g., due to lack of known physical dimension anchors, such that only up-to-scale depth maps may be produced). Moreover, some conventional depth estimation techniques may demand training using additional sensors (e.g., such as Light Detection and Ranging (LiDAR), camera stereo setup or radar sensors to enable absolute depth prediction), etc. However, such use of additional sensors is associated with added costs, added setup calibration (e.g., in the case of stereo cameras), dependency on the reliability of the additional sensors, etc.

There is a need in the art for improved depth estimation systems that can provide accurate results given practical system resource constraints (e.g., practical number of devices (e.g., sensors) included in an object detection system, practical electronic device memory constraints, practical electronic device computation constraints, practical system power consumption constraints, etc.).

SUMMARY

A method, apparatus, non-transitory computer readable medium, and system for estimating depth from monocular images using depth scale transfer are described. One or more aspects of the method, apparatus, non-transitory computer readable medium, and system include obtaining a monocular image that is based on target intrinsic parameters; generating an up-to-scale depth map based on the monocular image using a depth map network, wherein the depth map network is trained using a target image and a source image, wherein the target image is generated based on the target intrinsic parameters, and wherein the source image is generated based on source intrinsic parameters and modified to match the target intrinsic parameters; and generating a scaled depth map for the monocular image based on the up-to-scale depth map using a scaling function based on the target intrinsic parameters.

A method, apparatus, non-transitory computer readable medium, and system for estimating depth from monocular images using depth scale transfer are described. One or more aspects of the method, apparatus, non-transitory computer readable medium, and system include obtaining training data including a source image that is based on source intrinsic parameters; generating a modified source image based on the source image, wherein the modified source image is generated based on target intrinsic parameters; and training a depth map network to generate an up-to-scale depth map for a monocular image that is based on the target intrinsic parameters, wherein the depth map network is trained using the modified source image and target training data.

An apparatus, system, and method for estimating depth from monocular images using depth scale transfer are described. One or more aspects of the apparatus, system, and method include a camera configured to obtain a monocular image that is based on target intrinsic parameters of the camera; a depth map network configured to generate an up-to-scale depth map based on the monocular image, wherein the depth map network is trained using a target image and a source image, wherein the target image is generated based on the target intrinsic parameters, and wherein the source image is generated based on source intrinsic parameters and modified to match the target intrinsic parameters; and a scaling component configured to generate a scaled depth map for the monocular image based on the up-to-scale depth map using a scaling function based on the target intrinsic parameters.

DETAILED DESCRIPTION

Figure 1:
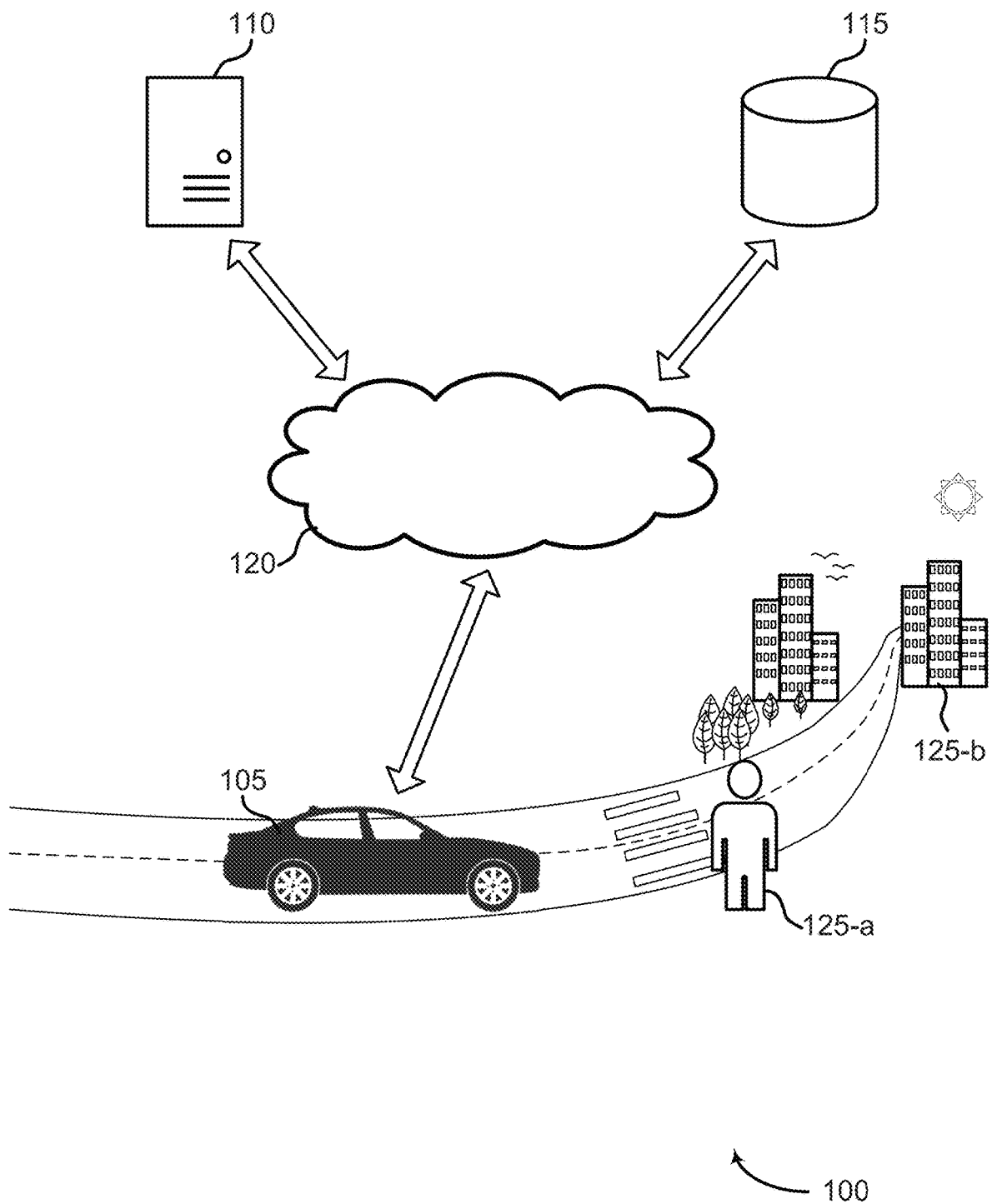
FIGS. 1 through 2 show example image processing systems according to aspects of the present disclosure.

Digital cameras may use image sensors (e.g., to capture images) and image signal processing techniques (e.g., to process the captured images). Image processing techniques that may be performed on captured images may include image sharpening, noise reduction, color control, image segmentation, object detection, and depth estimation, among various other specialized tasks.

For instance, object detection is a computer technology related to image processing and computer vision that includes tasks directed to detecting instances of semantic objects in digital images and videos (e.g., where object detection tasks may typically be configured to detect objects of a certain class, such as humans, buildings, cars, etc.). In some cases, object detection tasks may be configured to detect certain objects based on depth (e.g., autonomous driving applications may include object detection tasks configured to detect nearby objects, such as pedestrians, for safety avoidance applications). Depth estimation includes image processing techniques that may provide three-dimensional information about an object or scene, allowing for more accurate location and differentiation of objects in a three-dimensional scene (e.g., via interpretation of a detected object's size, shape, and location relative to other objects based on depth). Object detection and depth estimation may thus have applications in numerous areas of computer vision, including video surveillance (e.g., facial recognition), image retrieval, autonomous vehicles safety systems (e.g., pedestrian detection and avoidance), etc.

However, conventional depth estimation techniques often demand significant data collection and/or additional measurement information from multiple sensors. For example, depth estimators configured to infer depth from single images may demand continuous fine-tuning and continuous adjusting to new scenes (e.g., which may be time consuming, computationally expensive, etc.). Depth estimation from single images (e.g., monocular depth estimation) may have no known physical dimension anchor, and thus may not enforce an accurate scale on predictions. Therefore, estimating depth from single images with no information from additional sensors may produce only up-to-scale depth maps (e.g., estimated using self-supervised training). Alternatively, more complex solutions for estimating absolute depth may include training models using additional information from additional sensors (e.g., such as additional information from Light Detection and Ranging (LiDAR), camera stereo sensor setups, radar sensors, etc.), which may enable absolute depth prediction from single image. However, such solutions may thus be associated with increased system complexity, added sensor costs, added system dependency on the reliability of the additional sensors, added calibration requirements (e.g., for each of the additional sensors), etc.

The present disclosure provides efficient and accurate absolute depth estimation, from a single (e.g., monocular) image, using online depth scale transfer. That is, the image processing architectures and techniques described herein enable estimation of up-to-scale depth maps from monocular images that is decoupled from estimation of the depth scale (e.g., such that additional online measurements, additional calibrations, etc. are not required).

One or more aspects of the present disclosure include fine-tuning or training from scratch an absolute depth estimator using collected monocular images, as well as existing images and absolute depth measurements (e.g., from additional setups, such as LiDAR/stereo sensors). As described in more detail herein, collected monocular images (e.g., only from new scenes) may be used to create up-to-scale depth maps, and existing images and absolute depth measurements may be used to estimate the scale of a scene from an up-to-scale depth map and effectively achieve scale transfer between different domains. Such may enable scale transfer between an old domain (e.g., of the existing images/absolute depth measurements) and a new domain (e.g., of the newly collected monocular images). Accordingly, absolute depth may be estimated from monocular images without using additional sensors/online measurements, without requiring additional calibrations, etc.

Embodiments of the present disclosure may be used in various contexts, such as in an image (e.g., or video) processing system. For example, an image processing system (e.g., a camera) based on the present disclosure may implement absolute depth estimations using online depth scale transfer to reduce system costs and complexity otherwise associated with additional sensors/calibrations, as described in more detail below. One or more aspects of the inventive concept in the image processing context is provided with reference to FIG. 1. Moreover, details regarding example image processing systems and example depth estimation architectures are provided with reference to FIGS. 1 through 4. Example absolute depth estimation processes are provided with reference to FIGS. 5 through 7, and example training techniques are described with reference to FIGS. 8 and 9.

System Architecture

FIG. 1 shows an example of an image processing system 100 according to aspects of the present disclosure. In one aspect, image processing system 100 includes vehicle 105, server 110, database 115, cloud 120, and obstacles 125. Image processing system 100 is an example of, or includes aspects of, the corresponding element described with reference to FIG. 2. In the example of FIG. 1, the image processing system 100 may include an object detection system (e.g., such as an autonomous driving system) for the purpose of illustrating one or more aspects of the present disclosure, however the present disclosure is not limited thereto. The depth estimation architectures and techniques described herein may be implemented in other systems and contexts by analogy, without departing from the scope of the present disclosure.

As described herein, image processing systems 100 may include object detection depth estimation techniques. For instance, vehicle 105 may implement object detection and depth estimation techniques to identify and distinguish between close objects and distant objects (e.g., in order to enable safe navigation in object avoidance applications, autonomous driving applications, etc.). For example, close objects (e.g., obstacle 125-*a*) may pose a greater safety concern to the vehicle 105 and may demand more immediate responses, while distant objects (e.g., objects that do not pose more immediate safety concerns, such as obstacle 125-*b*) may be safely ignored. In some cases, such distinctions may be made by vehicle 105 (e.g., a navigation component or an obstacle detection system of the vehicle 105) based on distances between the vehicle 105 and the objects in the environment, where such distances may be predicted or estimated based on depth estimations of obstacles 125 in images captured or received by the vehicle 105.

Vehicle 105 may use one or more sensors (e.g., such as cameras, lidar, radar, etc.) to gather information about obstacles 125 in the environment. Sensor data may be processed to estimate the distance to each object in the field of view of the vehicle 105 (e.g., based on imaged object depth predictions). In some implementations, predicted or estimated depth information may be used to classify each obstacle 125 (e.g., as either close or distant based on a predefined distance threshold). Once the objects are classified (e.g., once obstacle 125 depth information is determined), the vehicle 105 can prioritize a response based on the proximity of the objects. For example, the vehicle 105 may generate an alert and/or take evasive action to avoid a close object (e.g., obstacle 125-*a*), while the vehicle 105 may ignore a distant object (e.g., obstacle 125-*b*) that poses no immediate threat. Obstacles 125 are examples of, or include aspects of, the corresponding elements described with reference to FIG. 7. By recognizing and prioritizing close objects (e.g., based on depth prediction techniques described herein), the vehicle 105 may provide safe navigation and reduce (e.g., minimize) the risk of collisions with obstacles 125.

In some cases, image processing system 100 may estimate distances of obstacles 125 from vehicle 105 using monocular images captured by vehicle 105. A monocular image may include, or refer to, a single two-dimensional representation of a three-dimensional scene captured by a single camera. In some aspects, monocular images may provide limited depth information (e.g., compared to a stereo image captured by two cameras).

Monocular depth estimation (MDE) is a fundamental problem in computer vision for various scene understanding applications (e.g., such as autonomous driving, robotics, augmented reality, image enhancement, etc.). Some methods for training MDE models may include fully supervised approaches, self-supervised approaches, etc. For example, in some cases, a fully supervised approach may be implemented where ground-truth depth measurements measured by LiDARs or stereo are used to train the network to achieve absolute depth predictions. In some cases, a self-supervised structure from motion (SFM) approach may be implemented where two images acquired at different times are used to predict the relative depth in a scene and relative pose between the two images. Contrary to the SFM approach, fully supervised training may enable absolute depth estimations. However, training or fine-tuning such models on new scenes may include collecting images in parallel to depth measurements, which may complicate the data collection setup with additional depth sensors and increasing its cost.

One or more aspects of the architectures and techniques described herein may confront such SFM limitations (e.g., by providing a method to transfer the depth scale from existing datasets, collected with ground truth depths, to newly collected datasets without such parallel depth measurements). This property thus enables infinite self-supervised fine-tuning (or training from scratch) of the MDE model on new scenes using only collected images, while achieving absolute depth scale predictions.

Fundamental properties of the SFM have a relation to depth scale. For instance, although SFM trained models can predict only up-to-scale depth values, fully geometrical SFM training results in an MDE that is able to linearly rank among various depths. Given such property, an MDE trained using such SFM regime on two different datasets may also linearly rank depths across them. For example, when correcting images from both domains to a single field-of-view (FOV), mixed training on both datasets is possible and is able to compensate for domain gaps (e.g., without using additional intermediate tasks). Furthermore, such property may be demonstrated when mixing (1) real and real datasets or (2) synthetic and real datasets, that were collected using different camera intrinsics (e.g., intrinsic parameters).

As linear ranking across two datasets is possible using SFM, when given two datasets (e.g., one collected with ground truth depth (the source) and another one collected without it (the target)) modeling the absolute depth to predicted depth on the source (S) domain may be transferred to the target (T) domain, thus achieving depth scale-transfer between the domains. In addition, such modeling may be achieved by using a single scalar globally estimated on the source (S) domain.

One or more aspects of the described techniques may be implemented using various real and synthetic source datasets, and the architectures and techniques described herein may achieve state-of-the-art depth scale transfer accuracy, achieve competitive absolute depth scale predictions to the fully supervised training regime, etc.

That is, as described in more detail below (e.g., with reference to FIGS. 2 through 7), architectures and techniques described herein may use monocular images (e.g., without the use of additional active sensors/additional online measurements) to efficiently and accurately estimate obstacle 125 distances from vehicle 105. For instance, vehicle 105 may utilize a single camera, a depth map network, and a scaling component to generate scaled depth maps for captured monocular images (e.g., based on generated up-to-scale depth maps using scaling functions based on intrinsic parameters of the single camera). These scaled depth maps can then be used by image processing system 100 (e.g., by vehicle 105) to calculate the distances of obstacles 125 in the scene (e.g., where the obstacles 125 in an example autonomous driving context may include other vehicles, pedestrians, road signs, etc.).

A server 110 provides one or more functions to users linked by way of one or more of the various networks. In some cases, the server 110 includes a single microprocessor board, which includes a microprocessor responsible for controlling all aspects of the server 110. In some cases, a server 110 uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server 110 is configured to send and receive hypertext markup language (HTML) formatted files (e.g., for displaying web pages). In various embodiments, a server 110 comprises a general purpose computing device, a personal computer, a laptop computer, a mainframe computer, a super computer, or any other suitable processing apparatus.

A database 115 is an organized collection of data. For example, a database 115 stores data in a specified format known as a schema. A database 115 may be structured as a single database 115, a distributed database 115, multiple distributed databases 115, or an emergency backup database 115. In some cases, a database 115 controller may manage data storage and processing in a database 115. In some cases, a user interacts with database 115 controller. In other cases, database 115 controller may operate automatically without user interaction.

A cloud 120 is a computer network configured to provide on-demand availability of computer system resources, such as data storage and computing power. In some examples, the cloud 120 provides resources without active management by the user. The term cloud 120 is sometimes used to describe data centers available to many users over the Internet. Some large cloud 120 networks have functions distributed over multiple locations from central servers 110. A server 110 is designated an edge server 110 if it has a direct or close connection to a user. In some cases, a cloud 120 is limited to a single organization. In other examples, the cloud 120 is available to many organizations. In one example, a cloud 120 includes a multi-layer communications network comprising multiple edge routers and core routers. In another example, a cloud 120 is based on a local collection of switches in a single physical location.

In some cases, vehicle 105 may be, or may include a computing device. A computing device is a personal computer, laptop computer, mainframe computer, palmtop computer, personal assistant, mobile device, or any other suitable processing apparatus.

Figure 2:
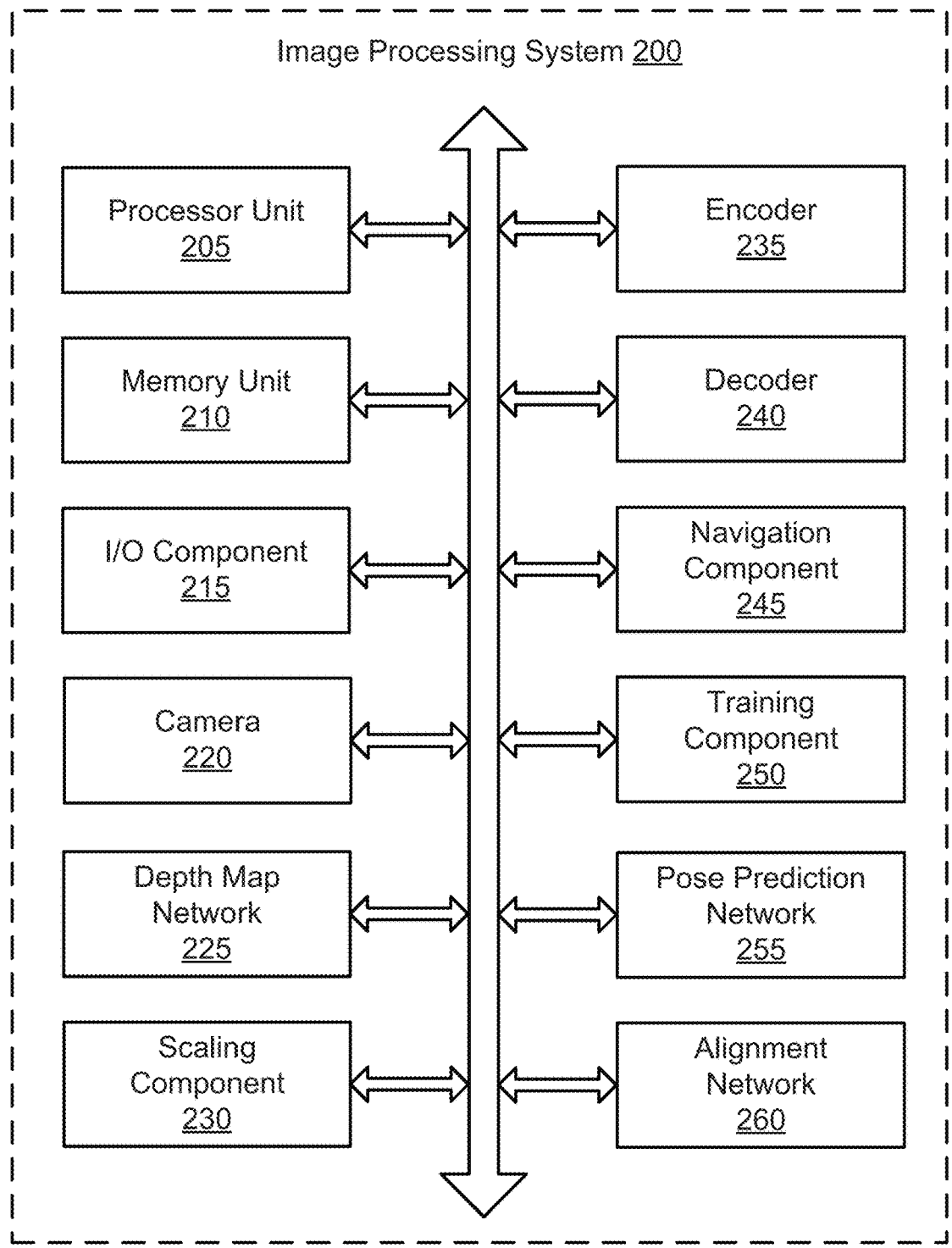

FIG. 2 shows an example of an image processing system 200 according to aspects of the present disclosure. In one aspect, image processing system 200 includes processor unit 205, memory unit 210, I/O component 215, camera 220, depth map network 225, scaling component 230, encoder 235, decoder 240, navigation component 245, training component 250, pose prediction network 255, and alignment network 260. In some aspects, image processing system 200 is an example of, or includes aspects of, the corresponding element(s) described with reference to FIG. 1. For example, in some implementations, image processing system 200 may be implemented as vehicle 105 or as server 110. In some implementations, image processing system 200 may be implemented via a combination of vehicle 105, server 110, database 115, and cloud 120 (e.g., where components of image processing system 200, and operations performed by image processing system 200, may be distributed across the vehicle 105, server 110, database 115, and cloud 120).

A processor unit 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 205 is configured to operate a memory array using a memory controller. In other cases, a memory controller is integrated into the processor unit 205. In some cases, the processor unit 205 is configured to execute computer-readable instructions stored in a memory to perform various functions. In some embodiments, a processor unit 205 includes special purpose components for modem processing, baseband processing, digital signal processing, or transmission processing.

Examples of a memory unit 210 (e.g., a memory device) include random access memory (RAM), read-only memory (ROM), or a hard disk. Examples of memory units 210 include solid state memory and a hard disk drive. In some examples, memory unit 210 is used to store computer-readable, computer-executable software including instructions that, when executed, cause a processor unit 205 to perform various functions described herein. In some cases, the memory unit 210 contains, among other things, a basic input/output system (BIOS) which controls basic hardware or software operation such as the interaction with peripheral components or devices. In some cases, a memory controller operates memory cells. For example, the memory controller can include a row decoder 240, column decoder 240, or both. In some cases, memory cells within a memory unit 210 store information in the form of a logical state.

An I/O component 215 (e.g., an I/O controller) may manage input and output signals for a device. I/O component 215 may also manage peripherals not integrated into a device. In some cases, an I/O component 215 may represent a physical connection or port to an external peripheral. In some cases, an I/O component 215 may utilize an operating system such as iOS®, ANDROID®, MS-DOS®, MS-WINDOWS®, OS/2®, UNIX®, LINUX®, or another known operating system. In other cases, an I/O component 215 may represent or interact with a modem, a keyboard, a mouse, a touchscreen, or a similar device. In some cases, an I/O component 215 may be implemented as part of a processor unit 205. In some cases, a user may interact with a device via I/O component 215 or via hardware components controlled by an I/O component 215.

A device may include an optical instrument (e.g., a camera 220, an image sensor, etc.) for recording or capturing images, which may be stored locally, transmitted to another location, etc. For example, a camera 220 may capture visual information using one or more photosensitive elements that may be tuned for sensitivity to a visible spectrum of electromagnetic radiation. The resolution of such visual information may be measured in pixels, where each pixel may relate to an independent piece of captured information. In some cases, each pixel may thus correspond to one component of, for example, a two-dimensional (2D) Fourier transform of an image. Computation methods may use pixel information to reconstruct images captured by the device. In a camera 220, an image sensors may convert light incident on a camera 220 lens into an analog or digital signal. An electronic device may then display an image on a display panel based on the digital signal. Image sensors are commonly mounted on electronics such as smartphones, tablet personal computers (PCs), laptop PCs, and wearable devices.

A pixel (e.g., a pixel sensor) may store information about received electromagnetic radiation (e.g., light). Each pixel may include one or more photodiodes and one or more complementary metal oxide semiconductor (CMOS) transistors. A photodiode may receive a light and may output charges. The amount of output charges may be proportional to the amount of light received by the photodiode. CMOS transistors may output a voltage based on charges output from the photodiode. The level of a voltage output from a photodiode may be proportional to the amount of charges output from the photodiode. That is, a level of a voltage output from a photodiode may be proportional to the amount of light received by the photodiode.

An encoder 235 may include, or refer to, a device or system that transforms information from one format or representation to another. In some examples, encoder 235 may map input data into a compact and more efficient representation (e.g., through a series of mathematical operations). The encoded data can be used for various purposes, such as data compression, transmission or storage, signal processing, and feature extraction.

A decoder 240 may include, or refer to, a device or system that transforms encoded information back into an original format or representation. In some examples, a decoder 240 may take a representation created by the encoder 235 and transform it into a different (e.g., original) format. In some aspects, a decoder 240 may play a complementary role to the encoder 235, and the decoder 240 may be used to recover information from the encoded data.

A navigation component 245 may provide navigation information (e.g., guidance and direction to a vehicle operator). For example, a navigation component 245 may include a GPS receiver, digital maps, a display screen, obstacle detection and avoidance, etc. In some cases, navigation component 245 may determine a vehicle's location, and digital maps may be used to generate routing information and display a current location and an intended route. In some cases, navigation component 245 may provide real-time updates on traffic conditions, estimated time of arrival, alternative routes, etc. Some navigation components 245 may also include features such as voice-activated control, points of interest, and speed limit warnings.

In some aspects, image processing system 200 may implement image processing networks to perform specialized tasks (e.g., with increased processing performance and reduced power consumption). For instance, neural network processing may be implanted for various imaging and computer vision applications. The architectures and techniques described herein enable high accuracy object detection with decreased system resource requirements (e.g., with decreased computational load, efficient network designs, etc.).

A neural network is a type of computer algorithm that is capable of learning specific patterns without being explicitly programmed, but through iterations over known data. A neural network may refer to a cognitive model that includes input nodes, hidden nodes, and output nodes. Nodes in the network may have an activation function that computes whether the node is activated based on the output of previous nodes. Training the system may involve supplying values for the inputs, and modifying edge weights and activation functions (algorithmically or randomly) until the result closely approximates a set of desired outputs.

An artificial neural network (ANN) is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

A convolutional neural network (CNN) is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

In some aspects, the architectures and techniques described herein enable efficient implementation of accurate object detector algorithms by monocular imaging systems. As such, image processing system 200 may include, or enable, single sensor systems without additional sensor information, power limited (e.g., battery-operated) depth estimation systems, depth estimation systems with area-limited system-on-chips (SOCs), etc.

A depth map network 225 may generate a depth map from an input image. In some aspects, a depth map may represent the distance (e.g., relative distance) of one or more objects in a scene captured by a camera 220. A depth map network 225 may implement techniques (e.g., such as computer vision techniques, machine learning techniques, etc.) to analyze an input image (e.g., a captured image) and predict a depth of each pixel in the image, the depth or distance of one or more objects in the scene, etc. Such information can be used for various image processing tasks, such as 3D reconstruction, object recognition, obstacle identification and avoidance, scene segmentation, etc.

According to some aspects, camera 220 obtains a monocular image that is based on target intrinsic parameters. In some examples, camera 220 obtains the monocular image using a camera 220, where the target intrinsic parameters correspond to a focal length and a sensor size of the camera 220. In some aspects, the target intrinsic parameters correspond to a field of view of the monocular image. In some aspects, camera 220 is an example of, or includes aspects of, the corresponding element(s) described with reference to FIG. 6A (e.g., camera 220 is an example of, or includes aspects of, sensor 610 and lens 615 described with reference to FIG. 6A).

According to some aspects, depth map network 225 generates an up-to-scale depth map based on the monocular image using a depth map network 225, where the depth map network 225 is trained using a source image generated based on source intrinsic parameters and modified to match the target intrinsic parameters. Depth map network 225 is an example of, or includes aspects of, the corresponding element described with reference to FIGS. 3 and 4.

According to some aspects, scaling component 230 generates a scaled depth map for the monocular image based on the up-to-scale depth map using a scaling function based on the target intrinsic parameters. In some examples, scaling component 230 determines the scaling function based on ground truth depth information. In some examples, scaling component 230 computes a scaling factor using a scaling network based on the up-to-scale depth map, where the scaled depth map is generated based on the scaling factor. Scaling component 230 is an example of, or includes aspects of, the corresponding element described with reference to FIG. 3.

According to some aspects, encoder 235 encodes the monocular image to obtain an image representation. Encoder 235 is an example of, or includes aspects of, the corresponding element described with reference to FIG. 3.

According to some aspects, decoder 240 decodes the image representation to obtain the up-to-scale depth map. Decoder 240 is an example of, or includes aspects of, the corresponding element described with reference to FIG. 3.

According to some aspects, navigation component 245 identifies an obstacle based on the scaled depth map. In some examples, navigation component 245 generates navigation information based on the identified obstacle.

According to some aspects, training component 250 is configured to train the depth map network in a self-supervised manner using up-to-scale depth information. For example, in some cases, training component 250 obtains training data including a source image that is based on source intrinsic parameters. In some examples, training component 250 generates a modified source image based on the source image, where the modified source image is generated based on target intrinsic parameters. In some examples, training component 250 trains a depth map network 225 to generate an up-to-scale depth map for a monocular image that is based on the target intrinsic parameters, where the depth map network 225 is trained using the modified source image. In some aspects, the source image is obtained from a source camera 220, and where the source intrinsic parameters correspond to a focal length and a sensor size of the source camera 220. In some examples, training component 250 obtains additional training data using a target camera 220, where the target intrinsic parameters correspond to a focal length and a sensor size of the target camera 220. In some examples, training component 250 trains a scaling network to generate a scaling factor based on the up-to-scale depth map using ground truth depth information. In some examples, training component 250 obtains the ground truth depth information for the source image. In some examples, training component 250 modifies the ground truth depth information to correspond to the modified source image based on the target intrinsic parameters.

According to some aspects, pose prediction network 255 (e.g., which in some cases may include, or refer to, a SFM component) generates additional up-to-scale depth information for the additional training data using a structure from motion (SFM) process. Pose prediction network 255 is an example of, or includes aspects of, the corresponding element described with reference to FIG. 4.

Figure 4:
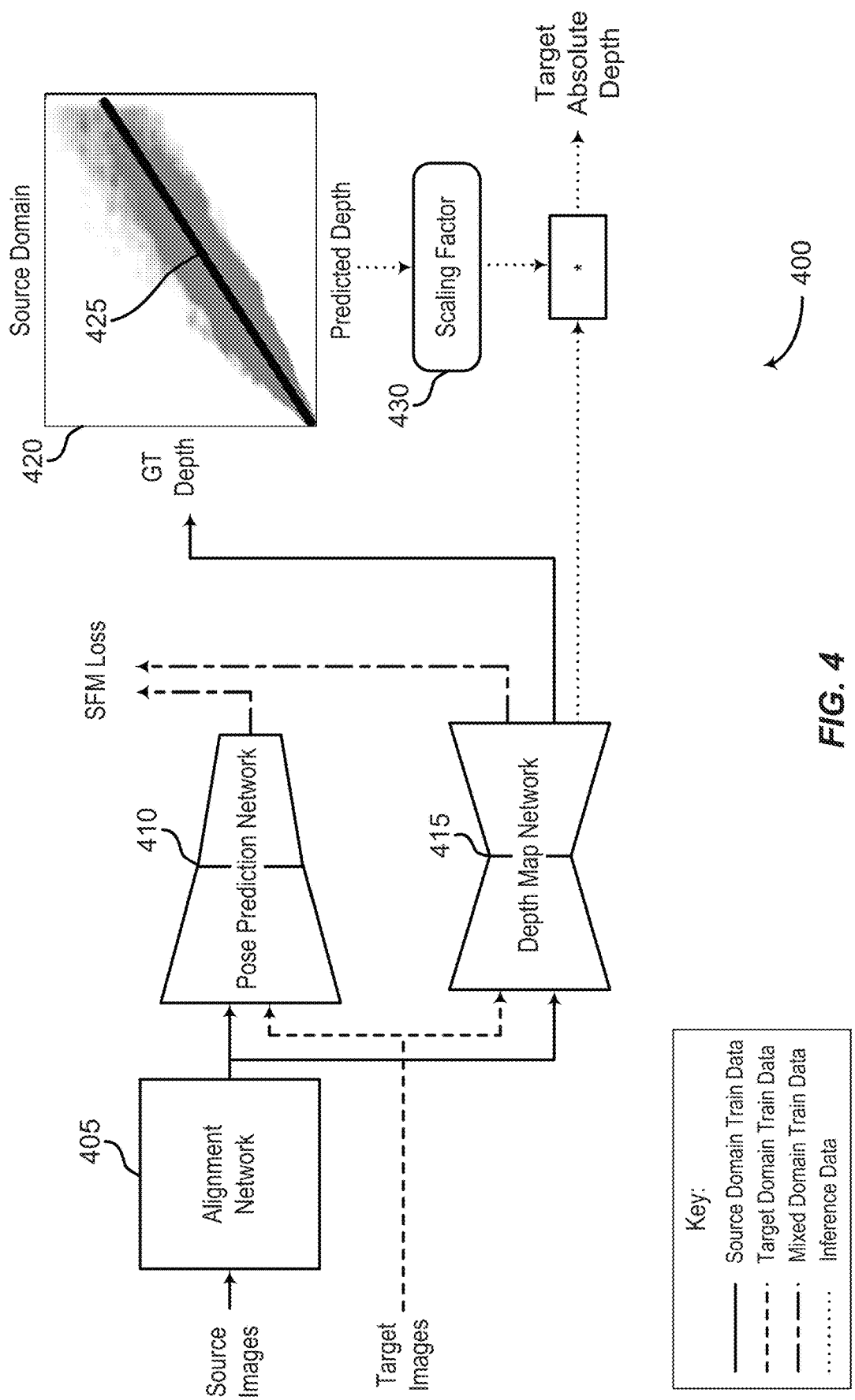

In some aspects, image processing system 200 includes alignment network 260, which may perform aspects related to field of view alignment (e.g., as described in more detail herein, for example, with reference to FIGS. 4 and 6). Alignment network 260 is an example of, or includes aspects of, the corresponding element described with reference to FIG. 4.

Accordingly, an apparatus, a system, and a method for estimating depth from monocular images using depth scale transfer are described. One or more aspects of the apparatus, system, and method include a camera 220 configured to obtain a monocular image that is based on target intrinsic parameters of the camera; a depth map network 225 configured to generate an up-to-scale depth map based on the monocular image, wherein the depth map network 225 is trained using a target image and a source image, wherein the target image is generated based on the target intrinsic parameters, and wherein the source image is generated based on source intrinsic parameters and modified to match the target intrinsic parameters; and a scaling component 230 configured to generate a scaled depth map for the monocular image based on the up-to-scale depth map using a scaling function based on the target intrinsic parameters.

Figure 3:
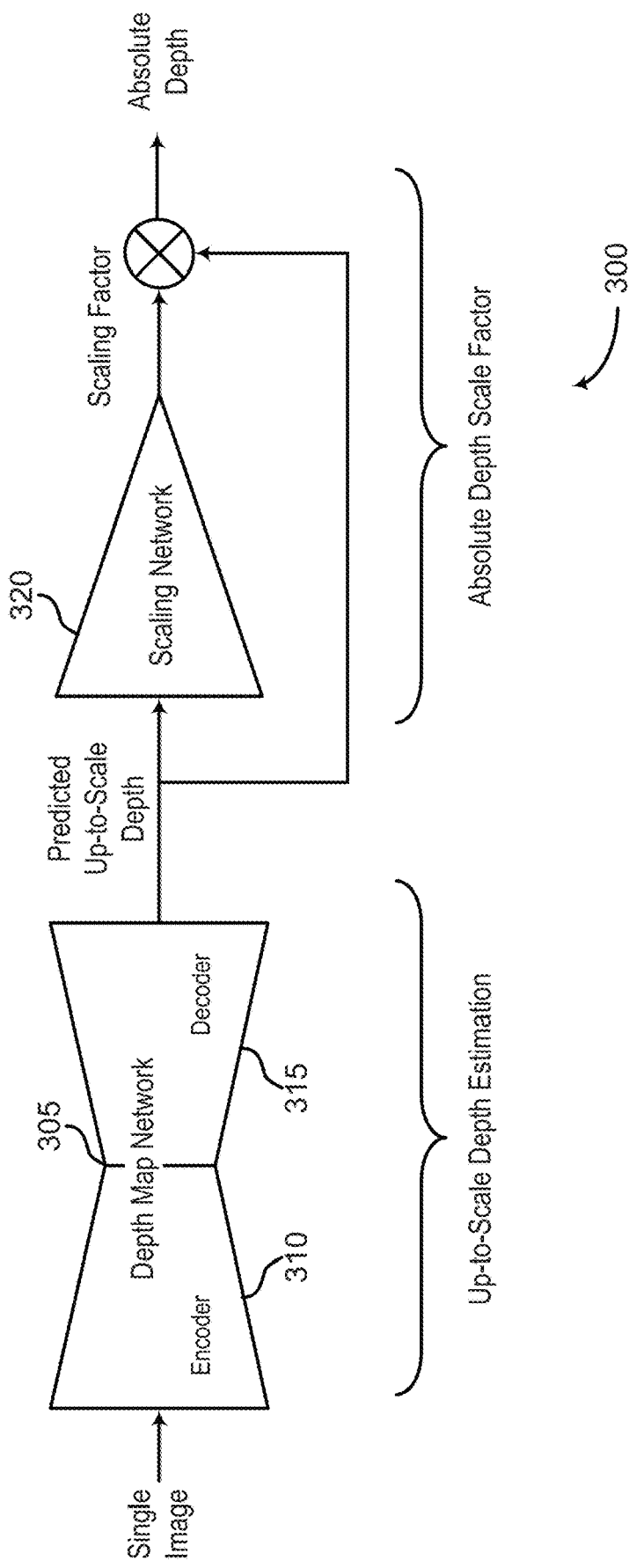
FIGS. 3 through 4 show example depth estimation architectures according to aspects of the present disclosure.

In various embodiments, the scaling component 230 may include, or refer to, scaling network 320 and/or scaling function/scaling factor 430, as described in more detail herein, for example, with reference to FIGS. 3 and 4. For instance, in some aspects, the scaling component 230 computes a scaling factor 430 based on the up-to-scale depth map, and wherein the scaled depth map is generated based on the scaling factor 430. Some examples of the apparatus, system, and method further include an encoder 235 configured to encode the monocular image to obtain an image representation. Some examples further include a decoder 240 configured to decode the image representation to obtain the up-to-scale depth map.

FIG. 3 shows an example of an example depth estimation architecture 300 according to aspects of the present disclosure. Depth estimation architecture 300 is an example of, or includes aspects of, the corresponding element described with reference to FIG. 4. In one aspect, depth estimation architecture 300 includes depth map network 305 and scaling network 320. Depth map network 305 is an example of, or includes aspects of, the corresponding element described with reference to FIGS. 2 and 4. In one aspect, depth map network 305 includes encoder 310 and decoder 315. Encoder 310 is an example of, or includes aspects of, the corresponding element described with reference to FIG. 2. Decoder 315 is an example of, or includes aspects of, the corresponding element described with reference to FIG. 2. Scaling network 320 is an example of, or includes aspects of, the scaling component 230 described with reference to FIG. 2.

As an example implementation, a first part of the depth estimation architecture 300 may include an encoder-decoder that estimates up-to-scale depth map from a monocular image. During training this depth estimation architecture 300 may be trained in a self-supervised manner together with a pose estimation network (e.g., described in more detail herein, for example, with reference to FIG. 4). A second part of the depth estimation architecture 300 may depict a scaling network 320 (e.g., a DScale-Net architecture) that learns to infer the depth scaling factor from the up-to-scale depth maps. This scaling factor may be multiplied during inference with the up-to-scale depth map to obtain the absolute depth map of a monocular image.

In some aspects, a depth map network 305 may include, or refer to, an architecture of an encoder 310 and a decoder 315. An encoder-decoder architecture (e.g., such as depth map network 305) may be used to predict up-to-scale depth maps from monocular images. In some cases, a first encoder-decoder architecture (e.g., depth map network 305) may be trained on the source (S) domain using source monocular images to predict up-to-scale depth maps $D_s$ and a second encoder-decoder (e.g., a second depth map network 305) may be trained separately on the target (T) domain monocular images to predict up-to-scale depth maps $D_T$.

For example, the depth map network 305 (including encoder 310 and decoder 315) may be trained together on the source and target domain (e.g., to achieve inter-domain linear ranking). During inference, the network 305 may be applied on source images and/or target images (e.g., any image from the source or target domain) to infer their up-to-scale maps. During training, scaling network 320 may use up-to-scale maps from the source and their ground truth to learn to predict the scaling factor. During inference, scaling network 320 may use up-to-scale maps from the source or target to predict their scaling factor. In some aspects, pose prediction network 410 (e.g., described in more detail herein, for example, with reference to FIG. 4)

may also be implemented in depth estimation architecture 300. A target (T) domain may include, or refer to, a domain of an image processing system (e.g., a domain of a camera in an image processing system, where the target (T) domain may be based at least in part on target intrinsic parameters of the camera in the image processing system). For instance, a target (T) domain may include, or refer to, a new domain environment for fine-tuning or training from scratch an absolute depth estimator using only images (e.g., monocular images) collected from a single camera. In some aspects, the target (T) domain may correspond to a camera used by the image processing system to obtain monocular images (e.g., where the target (T) domain may correspond to a focal length of the camera, a sensor size of the camera, a field of view of the monocular image, etc.).

A source (S) domain may include, or refer to, an environment for which both monocular images and information from one or more additional sensors were collected to enable absolute depth estimation (e.g., such as LiDAR, radar, additional camera for a stereo setup, etc.). In some aspects, a source (S) domain may include an environment that a source image is obtained (e.g., from a source camera), where the source (S) domain may be based at least in part on source intrinsic parameters of a source camera, which may be external to an image processing system).

An additional network (e.g., a scaling network 320, which in some examples may include a DScale-Net) may be fed the up-to-scale depth maps $D_s$. The scaling network 320 may be trained in a supervised manner using measurements (LiDAR, radar, stereo, etc.) to estimate a single scalar (e.g., Scale) used to correct the scaling of the input up-to-scale depth map $D_s$. This estimated scalar may then be used to correct the scaling of the predicted up-to-scale depth map, resulting in predicted absolute depth maps d following Equation [1]:

$$d = D * \text{Scale} \qquad [1]$$

Accordingly, depth estimation architecture 300 decouples between the prediction of up-to-scale depth maps from a monocular image and the prediction the scale of the scene. In addition, scaling network 320 (e.g., a DScale-Net, etc.) may directly process up-to-scale depth maps, and thus may be agnostic to various domain related factors (e.g., such as illumination and specific structures in the scene). The scaling network 320 (e.g., a DScale-Net module) may be coupled with a new up-to-scale encoder-decoder architecture trained on a different domain T (e.g., a depth map network 305 that is trained on a different target (T) domain). For example, scaling network 320 may be trained on source up-to-scale depth maps predicted by depth map network 305 (e.g., and depth map network 305 may be trained on source and target image to achieve inter-domain ranking). In some examples, a newly trained network 305 may include training again scaling network 320 on the source up-to-scale depth maps (e.g., because the up-to-scale depth maps inferred on the source may change due to the training on both domains, and the inter-domain ranking with the new target images impacts the up-to-scale depths of both source and target).

In some implementations, scaling network 320 (e.g., a scaling component) may include, or may be replaced with, a scaling function, such as a global scaling function or data fitting 425 (e.g., aspects of which are further described herein, for example, with reference to FIG. 4).

Moreover, during inference time, depth map network 305 may feed up up-to-scale depth maps to the scaling network 320 to correct the scale of estimated up-to-scale depth maps. For example, during inference time, an encoder-decoder architecture trained on target (T) domain may feed up-to-scale depth maps to the DScale-Net trained on source (S) domain to infer from them the scaling factor used for correcting the scale of the estimated up-to-scale depth map $D_T$. For example, encoder 310 and decoder 315 may be trained together on the source and target data (e.g., versus separate training on one source).

A depth map network 305 (e.g., an encoder-decoder architecture including encoder 310 and decoder 315) used for estimating up-to-scale depth map D from a monocular image $I_t$ at time t may be designed according to one or more aspects described herein. For example, in some cases, the encoder 310 may be implemented using MobileNet_v2 for feature extraction, but the present disclosure is not limited to thereto. In some examples, depth map network 305 may use, during training time, an auxiliary network to predict the relative pose G between two monocular images collected at time t and t+1 (or t−1). In some cases, both the encoder 310-decoder 315, and the pose architectures, may be jointly trained in a self-supervised manner. For instance, the depth map network 305 and the pose architectures may be trained such that the image at time t+1 is re-projected to the camera position at time t using the estimated translation matrix G between frame t and frame t+1, the camera intrinsics K and the estimated up-to-scale depth $D_t$ using the following Equation [2]:

$$p_{t+1} \sim K G_{t \to t+1} D_t K^{-1} p_t \qquad [2]$$
$$p_{t+1} \sim K G_{t \to t+1} D_t K^{-1} p_t$$

where p denotes the sample grid of an image, and $p_t$ denotes the location of pixels in the image. The obtained grid $p_{t+1}$ may then be used to sample the image $I_{t+1}$, resulting in the reprojected image $\hat{I}_t$.

The training of the networks reduces (e.g., minimizes) the reconstruction loss between $I_t$ and $\hat{I}_t$ (e.g., similarly to Equation [2]).

$$\mathcal{L}_p(I_t, \hat{I}_t) = \alpha \frac{1 - SSIM(I_t, \hat{I}_t)}{2} + (1-\alpha)\|I_t - \hat{I}_t\| \qquad [3]$$

In some examples, the scaling network 320 may be implemented using MobileNet_V2 (e.g., and its head was converted into a regression head) to predict a single depth scaling factor, but the present disclosure is not limited to such architectures. During training the scaling network 320 may be fed as input up-to-scale depth maps $D_s$ from the source (S) domain, and the scaling network 320 may be trained to predict the scene depth scaling factor Scale. That is, the entire predicted up-to-scale depth maps may be input to the scaling network 320, as they contain information from the entire encoder feature maps. Estimated up-to-scale depth maps D may be multiplied by the predicted scaling factor Scale to obtain the predicted absolute depth map. The scaling network 320 (e.g., a DScale-Net network) may be trained in a fully supervised manner using absolute depth measurements collected using additional sensors (e.g. LiDAR or estimated absolute depth from a stereo setup), using an L1 loss in the form of Equation [4]:

$$\mathcal{L}(d_{GT}, d_t) = \frac{1}{N}\sum_{i=0}^{N}|d_{GT_i} - d_{t_i}| \qquad [4]$$

where N is the number of pixels with ground truth depth valid measurements. The example implementation using Equation [4] described above is described for illustrative purposes, and is not intended to limit the scope of the present disclosure (e.g., other training not using L1 loss in the form of Equation [4] may be implemented by analogy, without departing from the scope of the present disclosure). During inference the network is fed an up-to-scale depth map $D_t$ from the target (T) domain to predict its depth scaling factor.

Accordingly, the present disclosure provides techniques for training/fine-tuning an absolute depth predictor (e.g., such as depth estimation architecture 300) using: (1) monocular images from a new domain and (2) already existing absolute depth measurements (e.g., which may be previously collected, collected by sensors external to the image processing system/depth estimation architecture 300, previously available to the depth estimation architecture 300 from existing datasets, etc.). The described depth estimation architectures and depth estimation techniques may be implemented for predicting absolute depth from monocular images without using additional online measurements, without using additional calibrations, etc.

FIG. 4 shows an example of an example depth estimation architecture 400 according to aspects of the present disclosure. Depth estimation architecture 400 is an example of, or includes aspects of, the corresponding element described with reference to FIG. 3. In one aspect, depth estimation architecture 400 includes alignment network 405, pose prediction network 410, depth map network 415, mapping 420, and scaling factor 430. Alignment network 405 is an example of, or includes aspects of, the corresponding element described with reference to FIG. 2. Pose prediction network 410 is an example of, or includes aspects of, the corresponding element described with reference to FIG. 2. Depth map network 415 is an example of, or includes aspects of, the corresponding element described with reference to FIGS. 2 and 3. In one aspect, mapping 420 includes data fitting 425.

In the example of FIG. 4, the field-of-view (FOV) of images from the source (e.g., Source Domain Train Data) is corrected to target field-of-view (FOV) via alignment network 405. The alignment network 405 may include an alignment algorithm, an alignment neural network, etc. Moreover, the alignment network 405 may allow training data (e.g., source image data) to have same scaling as target data (e.g., target image data, monocular image data, etc.). Some examples of the apparatuses, systems, and methods described herein include the alignment network 405 configured to align a field of view of the source image to a target field of view, wherein the source image is modified to match the target intrinsic parameters based on the alignment to the target field of view.

The pose prediction network 410 (e.g., which may include or implement a SFM component or SFM related training regime of the up-to-scale depth network) may be self-supervised trained on both source images and target training images (e.g., mixed batches of Source (S) Domain Train Data and Target (T) Domain Train Data). Some examples of the apparatuses, systems, and methods described herein include the pose prediction network 410 configured to generate the up-to-scale depth information for the monocular image using a SFM process. For instance, pose prediction network 410 may be trained to predict the pose (e.g., translation and rotation) between two images, and depth map network 415 may be trained to predict up-to-scale depth maps.

Moreover, data from the source domain (train or test) may be used to generate the mapping 420 (e.g., the ground truth (GT) vs. predicted up-to-scale mapping 420). In some examples, a global median fitting (e.g., data fitting 425 of the generated mapping 420) may be applied on the data to estimate the global scale factor for the depth network (e.g., a scaling factor 430). Generally, the data fitting 425 may include any suitable data fitting (or global scaling function) of the generated mapping 420, for example, such as a global median fit, a mean Random Sample Consensus (RANSAC) linear fit, etc.

In some aspects, depth estimation architecture 400 illustrates transferring the scaling factor 430 from the source domain to predict the target absolute depth.

Up-to-scale depth is estimated on the source domain and multiplied by the estimated global scale factor, resulting in absolute depth predicted maps. For instance, in the example of FIG. 4, Inference Data (e.g., up-to-scale depth information) is estimated via the depth map network 415, and the Inference Data is multiplied by the scaling factor 430 to predict the absolute depth maps (e.g., and thus scaled depth maps are generated for the monocular image, based on the up-to-scale depth map generated by the depth map network 415 using the scaling factor 430 based on the target intrinsic parameters). For example, up-to-scale depth maps may be estimated from the target (T) domain images and multiplied by the scale transfer factor (e.g., the scaling factor that was learned using the source data, executing scale transfer from source to target), achieving target absolute depth predicted maps.

Generally, any up-to-scale predicted map (source or target) may be scaled to absolute values using data fitting 425. For instance, applying this method on the test source up-to-scale depth maps can be used to achieve absolute depth predictions also for the source, while self-supervised training using SFM (e.g., instead of fully-supervision directly on the source, to avoid artifacts related to this full-supervision training regime, that the self-supervised regime is less sensitive to).

Image Depth Prediction

Figure 5:
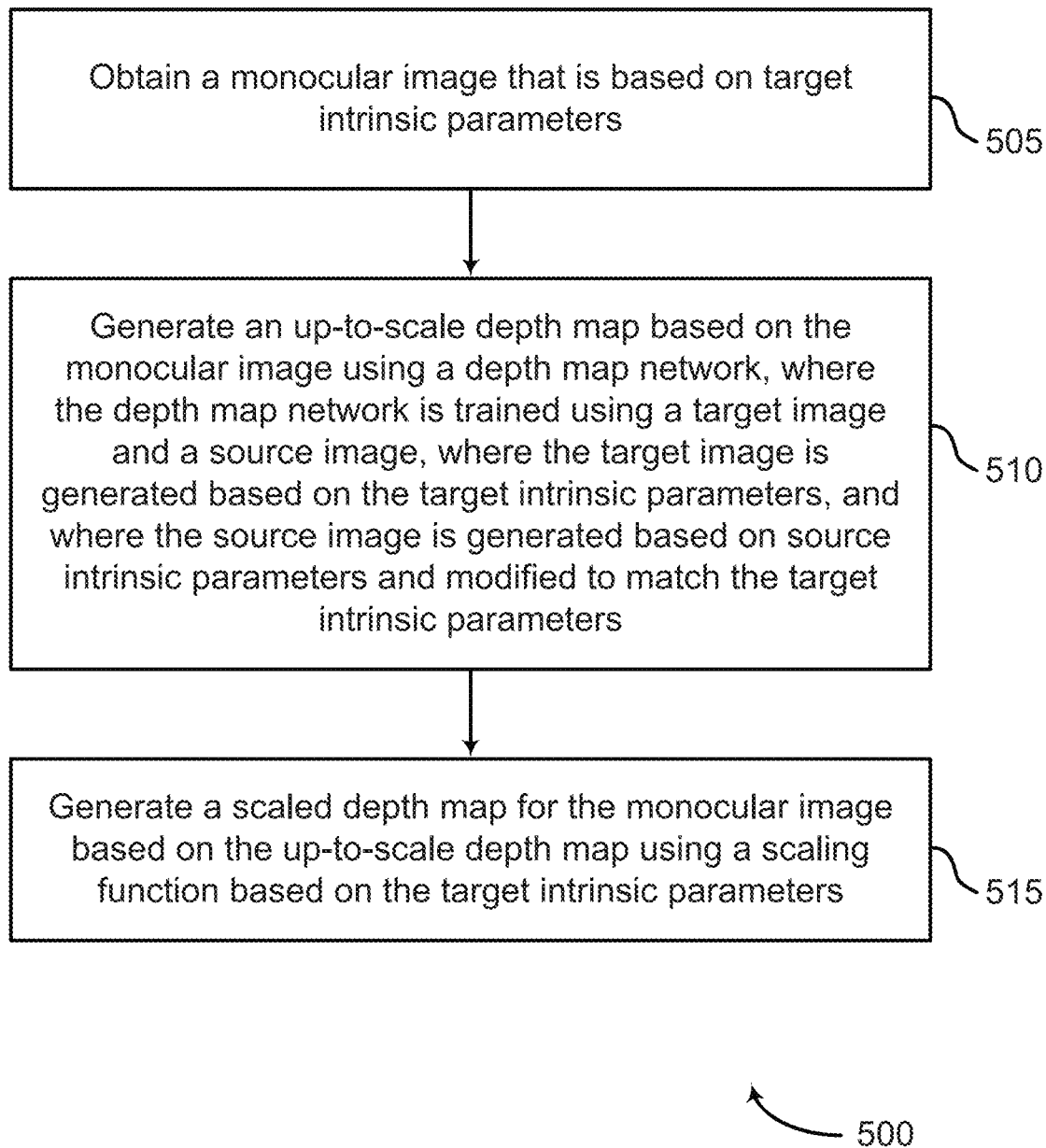
FIG. 5 shows an example of a method for image processing according to aspects of the present disclosure.

FIG. 5 shows an example of a method 500 for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

As described herein, the present disclosure enables training from scratch or fine-tuning depth estimators from monocular images only, without any additional measurements from other sensors (or additional calibrations) while achieving absolute depth estimation capability. As such, the architectures and techniques of the present disclosure may reduce data collection costs, simplify data collection setups, decouple factors affecting estimated depth quality (e.g., depth measurements vs. other), etc.

At operation 505, the system obtains a monocular image that is based on target intrinsic parameters. In some cases, the operations of this step refer to, or may be performed by, a camera as described with reference to FIG. 2.

At operation 510, the system generates an up-to-scale depth map based on the monocular image using a depth map network, where the depth map network is trained using a target image and a source image, wherein the target image is generated based on the target intrinsic parameters, and wherein the source image is generated based on source intrinsic parameters and modified to match the target intrinsic parameters. For instance, the depth map network may be trained on a mixture of both target training images and source images (e.g., source images with their FOV corrected to match the target FOV). As described in more detail herein, training the depth map network on both source images and target images may achieve depth ranking across the two domains, (e.g., as the depth map network is aware of the source images and the target data). In some cases, the operations of this step refer to, or may be performed by, a depth map network as described with reference to FIGS. 2-4.

At operation 515, the system generates a scaled depth map for the monocular image based on the up-to-scale depth map using a scaling function based on the target intrinsic parameters. In some cases, the operations of this step refer to, or may be performed by, a scaling component as described with reference to FIGS. 2 and 3.

Further, an apparatus, a non-transitory computer readable medium, and a system for estimating depth from monocular images using depth scale transfer are also described. One or more aspects of the apparatus, non-transitory computer readable medium, and system include obtaining a monocular image that is based on target intrinsic parameters; generating an up-to-scale depth map based on the monocular image using a depth map network, wherein the depth map network is trained using a target image and a source image, wherein the target image is generated based on the target intrinsic parameters, and wherein the source image is generated based on source intrinsic parameters and modified to match the target intrinsic parameters; and generating a scaled depth map for the monocular image based on the up-to-scale depth map using a scaling function based on the target intrinsic parameters.

Some examples of the method, apparatus, non-transitory computer readable medium, and system further include obtaining the monocular image using a camera, wherein the target intrinsic parameters correspond to a focal length and a sensor size of the camera.

In some aspects, the target intrinsic parameters correspond to a field of view of the monocular image.

Some examples of the method, apparatus, non-transitory computer readable medium, and system further include encoding the monocular image to obtain an image representation. Some examples further include decoding the image representation to obtain the up-to-scale depth map.

Some examples of the method, apparatus, non-transitory computer readable medium, and system further include determining the scaling function based on ground truth depth information.

Some examples of the method, apparatus, non-transitory computer readable medium, and system further include computing a scaling factor using a scaling network based on the up-to-scale depth map, wherein the scaled depth map is generated based on the scaling factor.

Some examples of the method, apparatus, non-transitory computer readable medium, and system further include identifying an obstacle based on the scaled depth map. Some examples further include generating navigation information based on the identified obstacle.

Figure 6A:
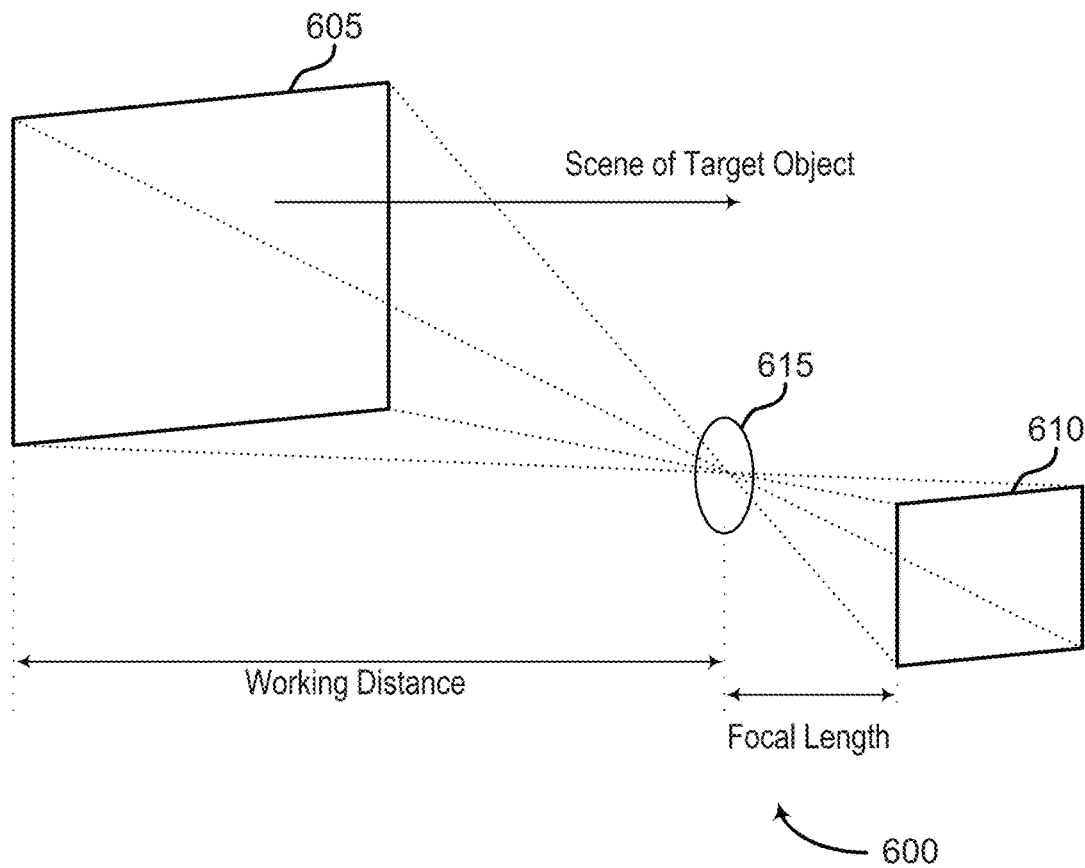
FIG. 6A shows an example of an image capture system according to aspects of the present disclosure.

FIG. 6A shows an example of an image capture system 600 according to aspects of the present disclosure. In one aspect, image capture system 600 includes field of view 605, sensor 610, and lens 615. In the example of FIG. 6A, a camera (e.g., sensor 610 and lens 615) obtains (e.g., generates) a monocular image based on intrinsic parameters of the camera. For instance, a camera may convert a scene of a target object onto a 2D plane (e.g., an image, a monocular image, etc.) based on intrinsic parameters of the camera including focal length, aperture, field-of-view, resolution, etc. In some aspects, sensor 610 and lens 615 may be examples of, or includes aspects of, the camera 220 described with reference to FIG. 2.

An image capture system 600 is a system that captures an image of a scene by using a camera lens 615, a camera sensor 610, and a field of view 605. The field of view 605 is the area of the scene that is visible to the camera, and it is determined by the camera lens 615 and the camera sensor 610. The camera lens 615 is responsible for focusing the light from the scene onto the camera sensor 610, and the camera sensor 610 is responsible for capturing the image data. The distance between the camera lens 615 and the camera sensor 610 is referred to as the focal length. The scene is located at a working distance from the camera lens 615, which is the distance between the camera lens 615 and the objects in the scene that are being captured. The image capture system 600 works by using the camera lens 615 to focus the light from the scene onto the camera sensor 610, which then captures the image data. The resulting image is a representation of the scene as seen through the camera's field of view 605. The quality and accuracy of the image captured by the image capture system 600 is determined by the properties of the camera lens 615 and the camera sensor 610, as well as the lighting conditions and other factors that affect the visibility of the scene.

Figure 6B:
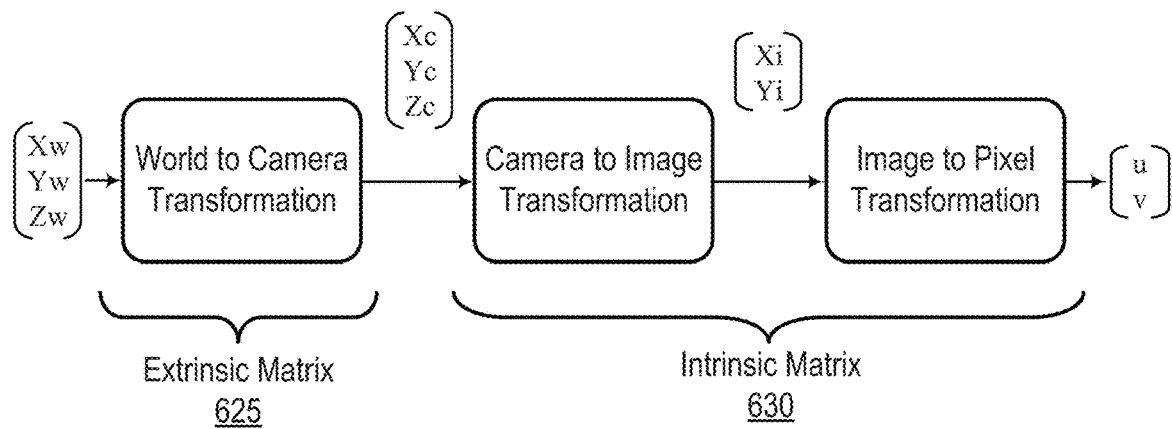
FIG. 6B shows an example of an image transformation system according to aspects of the present disclosure.

FIG. 6B shows an example of an image transformation system 620 according to aspects of the present disclosure. In one aspect, image transformation system 620 includes extrinsic matrix 625 and intrinsic matrix 630. The example of FIG. 6B shows how extrinsic and intrinsic parameters (e.g., which each may be represented as transformation matrices) impact conversion of points from a world coordinate system (Xw, Yw, Zw) to a pixel coordinate system (u, v). For example, the extrinsic matrix 625 is a transformation matrix that converts points from the world coordinate system (Xw, Yw, Zw) to the camera coordinate system (Xc, Yc, Zc), while the intrinsic matrix 630 is a transformation matrix that converts points from the camera coordinate system (Xc, Yc, Zc) to the pixel coordinate system (u, v).

An extrinsic matrix 625 of a camera may include, or refer to, a mathematical representation that transforms a real-world scene into a camera's reference frame. Extrinsic matrix 625 may describe or represent a position and orientation of a camera in a world coordinate system, and extrinsic matrix 625 may be used to map 3D points in the real-world scene to 2D points in the camera's image plane (e.g., for analysis, processing, etc.). In one example, an extrinsic matrix 625 may be a 4×4 matrix that combines rotation and translation information of a camera. In some aspects, an extrinsic matrix 625 may enable image transformation system 620 to understand the position and orientation of a camera relative to a real-world scene. In some cases, extrinsic matrix 625 may be estimated using computer vision techniques and machine learning techniques, among other techniques.

An intrinsic matrix 630 of a camera may include, or refer to, a mathematical representation that transforms a camera's internal representation of an image into a pixel representation. Intrinsic matrix 630 may describe or represent the intrinsic parameters of a camera and may be used to map 3D points in the camera's reference frame to 2D pixels in an image plane. In one example, an intrinsic matrix 630 may be a 3×3 matrix that combines the focal length, aspect ratio, and the principal point of a camera (e.g., and intrinsic matrix 630 may be used to project 3D points from a camera's reference frame into the image plane, where they can be represented as pixels). The intrinsic matrix 630 may enable image transformation system 620 to understand the properties of the camera and how the camera maps 3D points to 2D pixels. In some aspects, intrinsic matrix 630 may be combined with extrinsic matrix 625 to form a projection matrix (e.g., which maps 3D points from a real-world scene into 2D pixels in an image plane).

Figure 7:
FIG. 7 shows an example of an image processing system according to aspects of the present disclosure.
Figure 7:
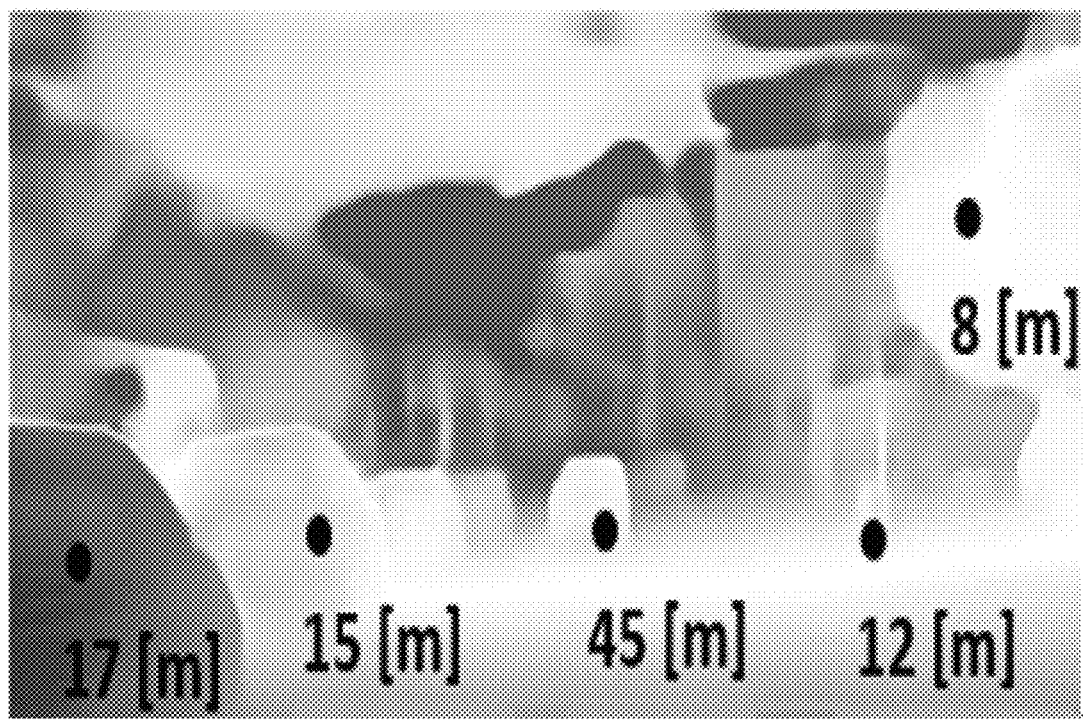

FIG. 7 shows an example of an image processing system according to aspects of the present disclosure. The example shown includes source image 700 and ground truth depth representation 710. In one aspect, source image 700 includes obstacles 705. Obstacles 705 is an example of, or includes aspects of, the corresponding element described with reference to FIG. 1. Ground truth depth representation 710 is an example of, or includes aspects of, the corresponding element described with reference to FIG. 9.

FIG. 7 illustrates aspects of how source images 700 (e.g., datasets) may be used for absolute depth measurements (used for training/fine tuning, as described in more detail herein). For instance, example source image 700 that includes obstacles 705 with known ground truth information. In the present example, obstacle 705-*a* has a known ground truth distance of 17 m in ground truth representation 710; obstacle 705-*b* has a known ground truth distance of 15 m in ground truth representation 710; obstacle 705-*c* has a known ground truth distance of 45 m in ground truth representation 710; etc.

In some examples, source images 700 may include, or refer to, images are taken existing datasets, images captured by one or more sensors external to the image processing system, etc. For example, source images 700 may include images from a Karlsruhe Institute of Technology and Toyota Technological Institute (KITTI) dataset, a Driver Dense Depth for Autonomous Driving (DDAD) dataset, etc. In some aspects, source images 700 may be taken from datasets that are collected from different cities (e.g., and thus contain different structures and textures). Accordingly, datasets of source images 700 and ground truth depth representations 710, where known absolute depth measurements are collected from, may be used for training and fine tuning.

Training

Figure 8:
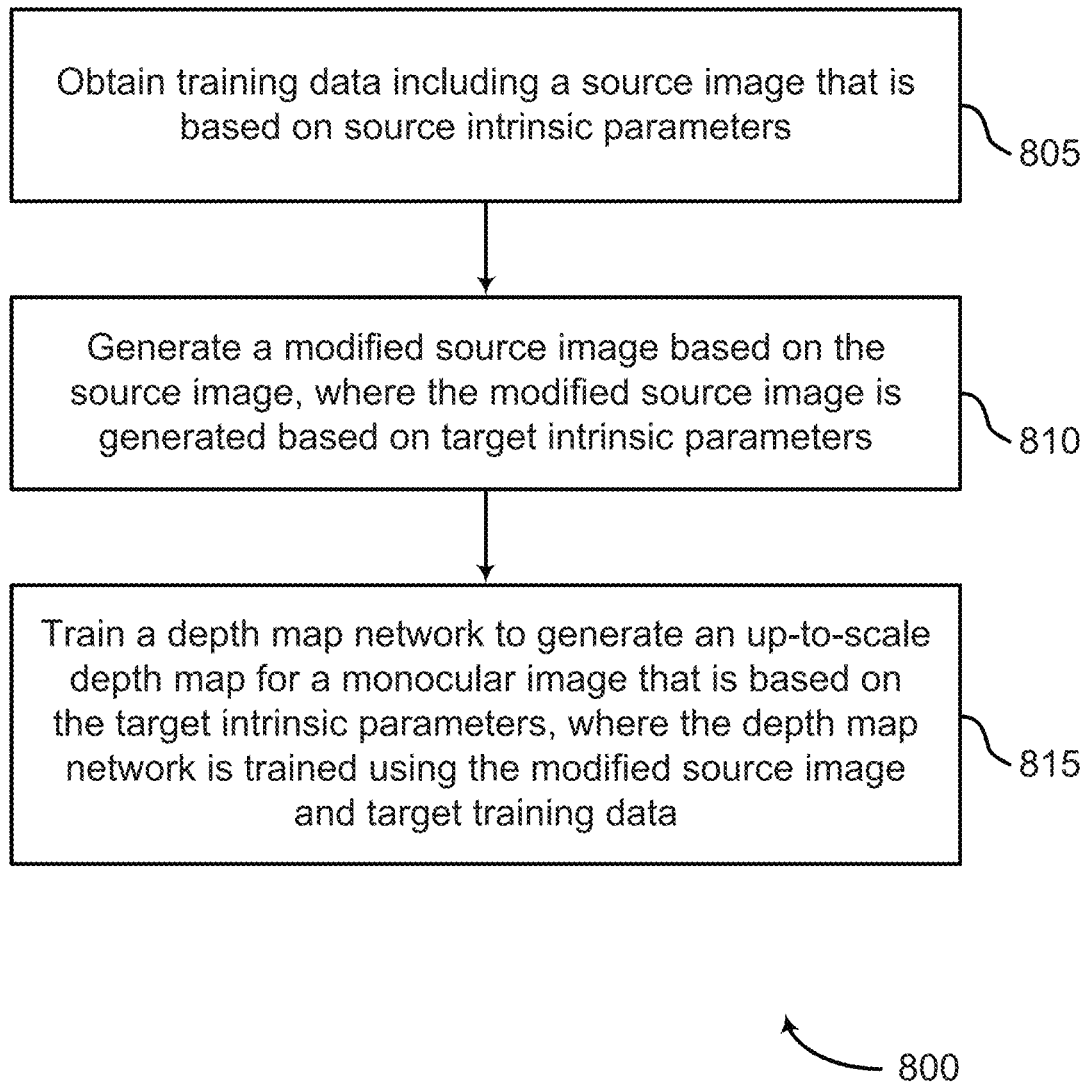
FIG. 8 shows an example of a method for image processing according to aspects of the present disclosure.

FIG. 8 shows an example of a method 800 for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

One or more aspects of the present disclosure include fine-tuning or training from scratch image processing system (e.g., an absolute depth estimator in an image processing system) using collected monocular images (e.g., only from new scenes to create up-to-scale depth maps), as well as existing images and absolute depth measurements (e.g., reusing existing images/measurements from additional set-ups external to image processing system, which may include LiDAR/stereo sensors, to estimate the scale of a scene from an up-to-scale depth map) to effectively achieve scale transfer between different domains.

At operation 805, the system obtains training data including a source image that is based on source intrinsic parameters. In some cases, the operations of this step refer to, or may be performed by, a training component as described with reference to FIG. 2.

At operation 810, the system generates a modified source image based on the source image, where the modified source image is generated based on target intrinsic parameters. In some cases, the operations of this step refer to, or may be performed by, a training component as described with reference to FIG. 2.

At operation 815, the system trains a depth map network to generate an up-to-scale depth map for a monocular image that is based on the target intrinsic parameters, where the depth map network is trained using the modified source image and target training data (e.g., target training images). In some cases, the operations of this step refer to, or may be performed by, a training component as described with reference to FIG. 2.

Further, an apparatus, a non-transitory computer readable medium, and a system for estimating depth from monocular images using depth scale transfer are also described. One or more aspects of the apparatus, non-transitory computer readable medium, and system include obtaining training data including a source image that is based on source intrinsic parameters; generating a modified source image based on the source image, wherein the modified source image is generated based on target intrinsic parameters; and training a depth map network to generate an up-to-scale depth map for a monocular image that is based on the target intrinsic parameters, wherein the depth map network is trained using the modified source image and target training data.

In some aspects, the source image is obtained from a source camera, and wherein the source intrinsic parameters correspond to a focal length and a sensor size of the source camera.

Some examples of the method, apparatus, non-transitory computer readable medium, and system further include obtaining additional training data using a target camera, wherein the target intrinsic parameters correspond to a focal length and a sensor size of the target camera.

Some examples of the method, apparatus, non-transitory computer readable medium, and system further include generating additional up-to-scale depth information for the additional training data using a SFM process.

Some examples of the method, apparatus, non-transitory computer readable medium, and system further include training a scaling network to generate a scaling factor based on the up-to-scale depth map using ground truth depth information.

Some examples of the method, apparatus, non-transitory computer readable medium, and system further include obtaining the ground truth depth information for the source image. Some examples further include modifying the ground truth depth information to correspond to the modified source image based on the target intrinsic parameters.

Figure 9:
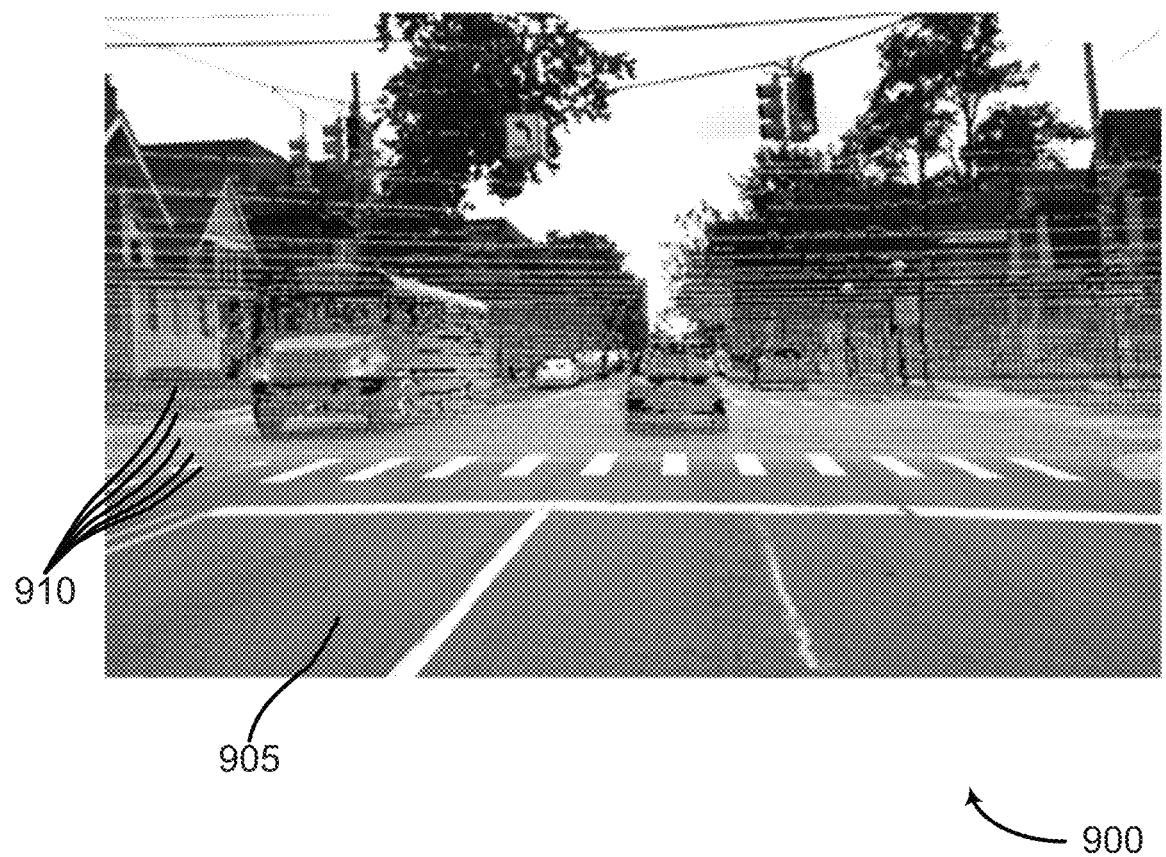
FIG. 9 shows an example of a field of view alignment system according to aspects of the present disclosure.

FIG. 9 shows an example of a ground truth depth representation 900 according to aspects of the present disclosure. In one aspect, ground truth depth representation 900 includes source image 905 and absolute depth measurements

910. Ground truth depth representation 900 is an example of, or includes aspects of, the corresponding element described with reference to FIG. 7.

As described in more detail herein, an absolute depth estimator may be trained using (e.g., in addition to collected monocular images) existing source images and absolute depth measurements (e.g., such as source image 905 and absolute depth measurements 910, which may include, for example, absolute depth measurements 910 from additional setups such as LiDAR/stereo sensors). For example, in some cases, a fully-supervised approach may be implemented where ground-truth depth measurements 910 measured by LiDARs or stereo are used to train the network (e.g., such as scaling network 320) to achieve absolute depth predictions.

In some cases, FIG. 9 shows aspects of an example field-of-view (FOV) alignment (e.g., which may be processed or performed by an alignment network, such as alignment network 260, alignment network 405, etc.). For example, ground truth depth representation 900 may be aligned to a target field of view, such that source image 905 (e.g., and corresponding ground truth depth representation 900) may be modified to match the target intrinsic parameters (e.g., based on the alignment to a target field of view representation).

Training an MDE (e.g., such as depth map network 305, depth map network 415, etc.) on images collected using different camera intrinsic parameters (real or synthetic) may introduce significant geometrical differences (e.g., such that some other SFM training regimes may not accurately compensate for). However, some datasets for autonomous driving (e.g., KITTI, DDAD, etc.) may be collected using different source cameras (e.g., which thus may have different source intrinsic parameters and different source extrinsic parameters). In some cases, camera heights associated with source images may be relatively similar (e.g., due to the nature of how the data is collected for autonomous driving datasets), and small differences in camera heights may be compensated for by the network.

However, source camera intrinsic parameters may significantly differ, which may impact field-of-view (FOV) properties. To enable training on mixed batches of images from two datasets of source images, without breaking geometrical consistency, techniques described herein may be implemented to align the field-of-view (FOV) of the source images to the field-of-view (FOV) of the target images. For instance, the field-of-view (FOV) of a camera may be represented as, or defined as, Equation [5]:

$$\angle \frac{FOV}{2} = a\tan\left(\frac{w}{2f}\right) \quad [5]$$

where f is the focal length of the camera in pixel units and w is the width of the image. The focal length of the camera and the image width in the target domain may be represented as $f_T$ and $w_T$, respectively. The focal length of the camera of the source domain may be represented as $f_S$. To correct the field-of-view (FOV) of the source domain, the image width $w_S$ may be corrected into $w_{S \to T}$ such that source field-of-view (FOV) equals to the target field-of-view (FOV). For instance, using Equation [5], Equation [6] may be obtained:

$$\angle \frac{FOV_T}{2} = a\tan\left(\frac{w_T}{2f_T}\right) = a\tan\left(\frac{w_{S \to T}}{2f_S}\right) \quad [6]$$

which may further result in Equation [7]:

$$w_{S \to T} = w_T \frac{f_S}{f_T} \quad [7]$$

Equation [7] may effectively determine the width of the crop taken from the source images. The height of the crop may then be determined according to the target image aspect ratio. Eventually the image crop may be resized using, for example, a bilinear interpolation to the target image size to enable mixed batches.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described systems and methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
    obtaining a monocular image that is based on target intrinsic parameters corresponding to a target camera;
    generating an up-to-scale depth map based on the monocular image using a depth map network, wherein the depth map network is trained using a target image and a modified source image modified from a source image obtained using a source camera different from the target camera, wherein the target image is generated based on the target intrinsic parameters, and wherein the modified source image is generated based on source intrinsic parameters and modified to match the target intrinsic parameters, the source intrinsic parameters corresponding to the source camera; and
    generating a scaled depth map for the monocular image based on the up-to-scale depth map using a scaling function based on the target intrinsic parameters.

2. The method of claim 1, wherein the target intrinsic parameters correspond to a focal length and a sensor size of the target camera.

3. The method of claim 1, wherein the target intrinsic parameters correspond to a field of view of the monocular image.

4. The method of claim 1, further comprising:
    encoding the monocular image to obtain an image representation; and
    decoding the image representation to obtain the up-to-scale depth map.

5. The method of claim 1, further comprising:
    determining the scaling function based on ground truth depth information.

6. The method of claim 1, further comprising:
    computing a scaling factor using a scaling network based on the up-to-scale depth map, wherein the scaled depth map is generated based on the scaling factor.

7. The method of claim 1, further comprising:
    identifying an obstacle based on the scaled depth map; and
    generating navigation information based on the identified obstacle.

8. A method comprising:
    obtaining training data including a source image that is based on source intrinsic parameters, the source image being obtained using a source camera;
    generating a modified source image based on the source image, wherein the modified source image is generated by modifying the source image to match target intrinsic parameters; and
    training a depth map network to generate an up-to-scale depth map for a monocular image that is based on the target intrinsic parameters and obtained using a target camera different from the source camera, wherein the depth map network is trained using the modified source image and target training data.

9. The method of claim 8, wherein the source intrinsic parameters correspond to a focal length and a sensor size of the source camera.

10. The method of claim 8, further comprising:
    obtaining additional training data using a target camera, wherein the target intrinsic parameters correspond to a focal length and a sensor size of the target camera.

11. The method of claim 10, wherein:
    generating additional up-to-scale depth information for the additional training data using a structure from motion (SFM) process.

12. The method of claim 8, further comprising:
    training a scaling network to generate a scaling factor based on the up-to-scale depth map using ground truth depth information.

13. The method of claim 12, further comprising:
    obtaining the ground truth depth information for the source image; and
    modifying the ground truth depth information to correspond to the modified source image based on the target intrinsic parameters.

14. An apparatus comprising:
    a target camera configured to obtain a monocular image that is based on target intrinsic parameters of the target camera;
    a depth map network configured to generate an up-to-scale depth map based on the monocular image, wherein the depth map network is trained using a target image and a modified source image modified from a source image obtained using a source camera different from the target camera, wherein the target image is generated based on the target intrinsic parameters, and wherein the modified source image is generated based on source intrinsic parameters and modified to match the target intrinsic parameters, the source intrinsic parameters corresponding to the source camera; and
    a scaling component configured to generate a scaled depth map for the monocular image based on the up-to-scale depth map using a scaling function based on the target intrinsic parameters.

15. The apparatus of claim 14, further comprising:
    an encoder configured to encode the monocular image to obtain an image representation; and
    a decoder configured to decode the image representation to obtain the up-to-scale depth map.

16. The apparatus of claim 14, wherein the scaling component computes a scaling factor based on the up-to-scale depth map, and wherein the scaled depth map is generated based on the scaling factor.

17. The apparatus of claim 14, further comprising:
    a navigation component configured to identify an obstacle based on the scaled depth map and generate navigation information based on the identified obstacle.

18. The apparatus of claim 14, further comprising:
    a training component configured to train the depth map network in a self-supervised manner using up-to-scale depth information.

19. The apparatus of claim 18, further comprising:
    a pose prediction network configured to generate the up-to-scale depth information for the monocular image using a structure from motion (SFM) process.

20. The apparatus of claim 14, further comprising:
    an alignment network configured to align a field of view of the source image to a target field of view, wherein the source image is modified to match the target intrinsic parameters based on the alignment to the target field of view.

* * * * *